US006871827B2

(12) United States Patent
Petak et al.

(10) Patent No.: US 6,871,827 B2
(45) Date of Patent: Mar. 29, 2005

(54) UNIVERSAL ELECTRICAL OUTLET BOX MOUNTING BRACKET

(75) Inventors: Randy Petak, Pico Rivera, CA (US); Joshua Kueng, Whittier, CA (US)

(73) Assignee: PW Industries, Inc., Pico Rivera, CA (US)

( * ) Notice: Subject to any disclaimer, the term of this patent is extended or adjusted under 35 U.S.C. 154(b) by 0 days.

(21) Appl. No.: 10/137,856

(22) Filed: May 3, 2002

(65) Prior Publication Data

US 2003/0205654 A1 Nov. 6, 2003

(51) Int. Cl.[7] .................................................. A47F 5/00
(52) U.S. Cl. ..................... 248/300; 248/27.1; 248/906; 174/58; 174/63; 220/3.2; 220/3.9
(58) Field of Search ........................... 248/311.2, 205.1, 248/300, 906, 27.1; 174/58, 63; 220/3.2, 3.3, 3.9, 3.92, 3.94; D13/152

(56) References Cited

U.S. PATENT DOCUMENTS

| 1,225,525 | A | | 5/1917 | Sweet | |
| 4,399,922 | A | | 8/1983 | Horsley | |
| 4,533,060 | A | * | 8/1985 | Medlin | 220/3.9 |
| 4,569,458 | A | | 2/1986 | Horsley | |
| 4,572,391 | A | * | 2/1986 | Medlin | 220/3.9 |
| 4,603,789 | A | * | 8/1986 | Medlin, Sr. | 220/3.9 |
| 4,688,693 | A | * | 8/1987 | Medlin, Jr. | 220/3.9 |
| 4,732,356 | A | | 3/1988 | Medlin, Sr. | |
| 4,757,908 | A | | 7/1988 | Medlin, Sr. | |
| 4,964,525 | A | | 10/1990 | Coffey et al. | |
| 5,098,046 | A | * | 3/1992 | Webb | 248/27.1 |
| 5,176,345 | A | | 1/1993 | Medlin | |
| 5,224,673 | A | * | 7/1993 | Webb | 248/27.1 |
| 5,263,676 | A | | 11/1993 | Medlin, Jr. et al. | |
| 5,288,041 | A | * | 2/1994 | Webb | 248/27.1 |
| 5,423,499 | A | * | 6/1995 | Webb | 248/27.1 |
| 5,595,362 | A | | 1/1997 | Rinderer et al. | |
| 5,965,844 | A | | 10/1999 | Lippa | |
| 6,188,022 | B1 | | 2/2001 | He | |
| 6,209,836 | B1 | * | 4/2001 | Swanson | 248/300 |
| 6,323,424 | B1 | * | 11/2001 | He | 174/58 |
| 6,384,334 | B1 | * | 5/2002 | Webb | 174/58 |

* cited by examiner

Primary Examiner—Ramon O. Ramirez
Assistant Examiner—Naschica S. Morrison
(74) Attorney, Agent, or Firm—Christie, Parker & Hale, LLP

(57) ABSTRACT

An electrical outlet box mounting bracket for mounting large size and small size standard electrical outlet boxes. The bracket has a flat section of material having a cutout pattern formed therein. The cutout pattern has a generally octagonal opening formed therein with a first, a second, a third and a fourth diagonally offset corner, and straight edges therebetween. A first, a second and a third closed keyhole slot is located inwardly of the first diagonal corner of the bracket, the keyhole slots having a wider end and a narrower slot portion with a terminal end. A first, a second and a third open slot are located diagonally opposite the keyhole cutouts in the third diagonal corner and opened therein. The open slots have a terminal end therein. The distances between the terminal end of the first closed keyhole slot and the terminal end of the first open slot and between the terminal end of the third closed keyhole slot and the terminal end of the third open slot are about the same as the spacing of screw holes in diagonally opposed tabs of a standard 5S electrical outlet box, and the distance between the terminal end of the second closed keyhole slot and the terminal end of the second open slot is about the same as the spacing of screw holes in diagonally opposed tabs of a standard 4S electrical outlet box.

22 Claims, 17 Drawing Sheets

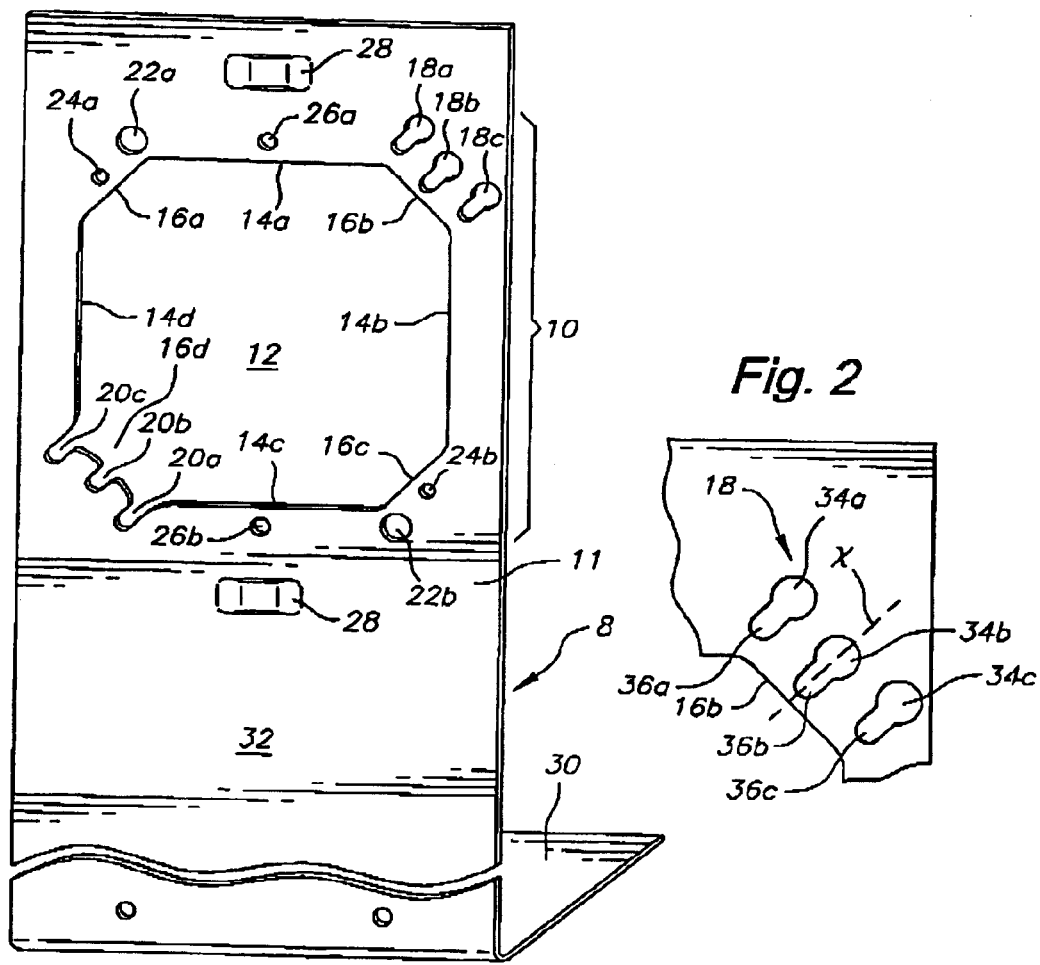

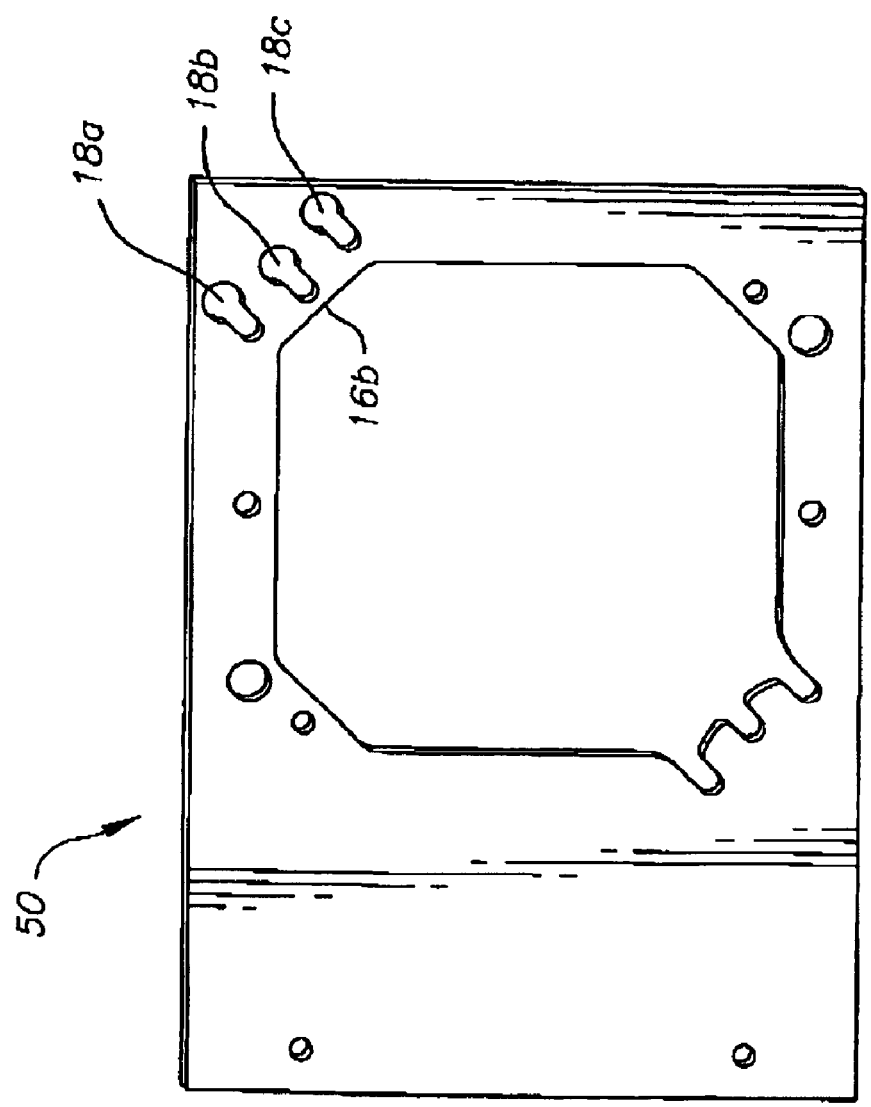

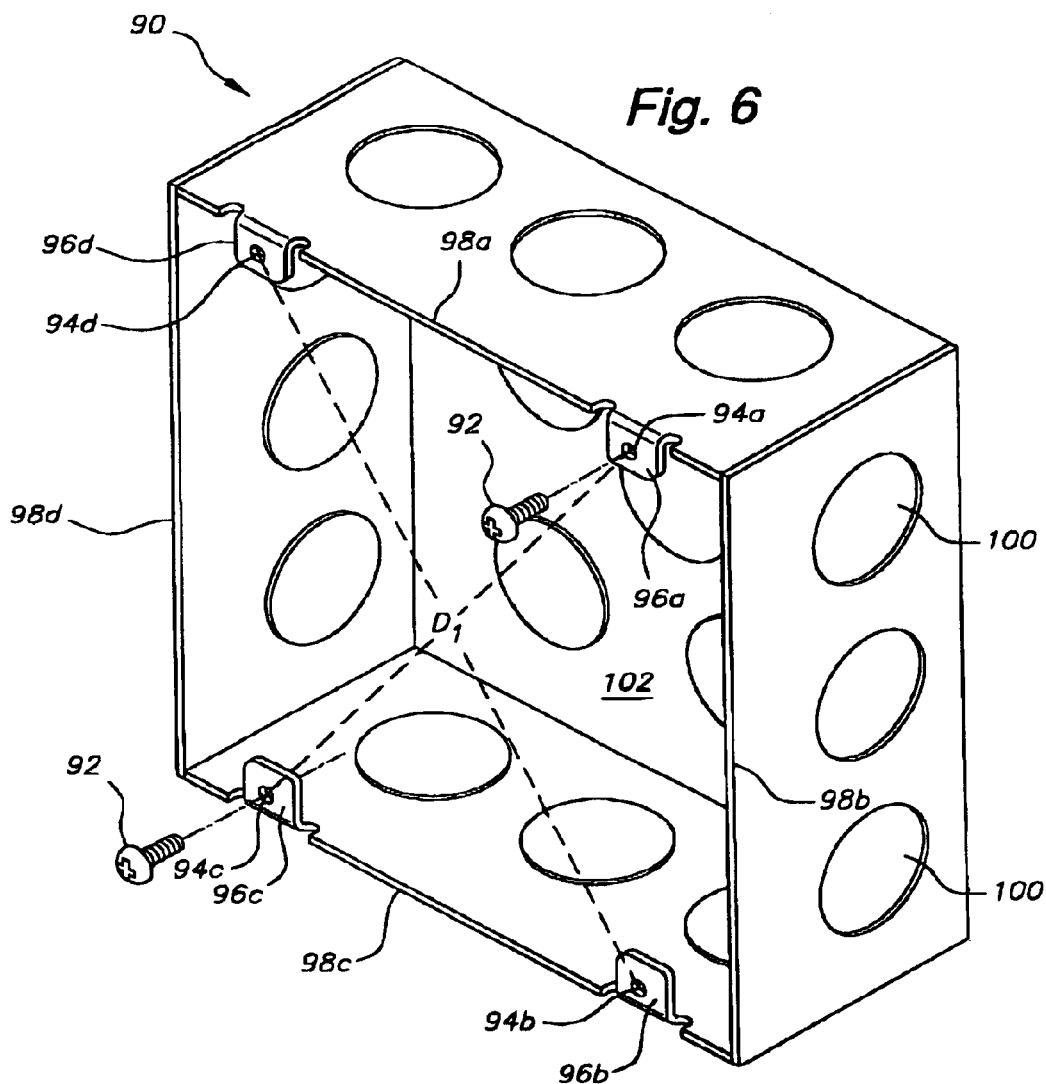

UNIVERSAL ELECTRICAL OUTLET BOX MOUNTING BRACKET

BACKGROUND OF THE INVENTION

The present invention relates to the field of brackets for mounting of outlet boxes, and more specifically to brackets for mounting outlet boxes to vertical studs, to a floor, or to ceiling and floor joists, which brackets permit the attachment and detachment of a drywall ring without causing the outlet box to become detached from the bracket.

In the construction industry, particularly in commercial construction, improvements which increase worker productivity, decrease the time to complete a project, and improve job quality are highly desirable. Presently, contractors and builders endeavor to reduce labor costs by simplifying on-site assembly and wiring as much as possible. Particularly in commercial construction, where union labor is expensive and there are tight deadlines, the use of pre-wired electrical outlet boxes and subsystems are growing in popularity. In electrical contracting, the trend has been to use brackets which mount to studs, to the floor (or a track on a floor) and to ceilings, which brackets will support outlet boxes (e.g. for mounting of electrical utilities, speakers, telephone, computer cabling, television, etc.) mounted to a back thereof. These brackets provide extra flexibility in positioning outlet boxes, and function particularly well in jobs where pre-wired electrical outlet boxes are used. After the outlet box is fixed to a bracket, a drywall or plaster ring (hereinafter the term "drywall ring" will be used) is attached to the front of the bracket, which drywall ring can be selected based on the thickness of the wall covering, the layout of plugs and outlets, and other job requirements.

It is desirable to provide a reduced number of styles of brackets which can accommodate a larger number of di&rent standard outlet boxes without having to remove and reinstall the screws on the outlet box. It is also desirable to reduce the number of screws required to attach an outlet box to a bracket. It is further desirable to provide a bracket design which permits a drywall ring to be attached and detached from the bracket without causing the outlet box to become disconnected from the bracket.

SUMMARY OF THE INVENTION

The invention provides a bracket conduit box for mounting different sizes and styles of outlet boxes to vertical studs, to a floor, and to ceiling rafters, which brackets permit the attachment and detachment of a drywall ring without causing the outlet box from becoming detached from the brackets.

The brackets of the invention provide a metal sheet with first and second opposite faces, and with a generally rectangular opening formed therein which is commonly shared amongst different brackets. This advantageously permits a single die to be used to form a large variety of bracket configurations. A first and a second group of slot formation are formed in the bracket at two diagonally opposed corners. The first group of slots comprises at least two and preferably three parallel and spaced apart closed keyhole slots. Each closed keyhole slot has a narrower elongate slot region that is sized to slidably receive a shaft of a standard screw which holds a drywall ring to an outlet box, and a larger rounded end, which is larger than a screw head of a standard drywall ring holding screw. The second group of slots comprises a same number of elongate slots that open into the generally rectangular opening in the bracket. The groups of the first and second slot formations are formed on the bracket such that the longitudinal axes of each of the closed keyhole slots preferably lie on the same axis as the longitudinal axis of each opposite elongate open slots, thereby permitting a conduit box to slide from a detached position to an attached position, without any twisting action. The multiple axes are preferably parallel as well. At the other diagonally offset corners of the generally rectangular opening, a hole pattern comprising a larger hole and a smaller hole are provided, the purpose of which is to clear any additional screws remaining in the outlet box and make them available for retaining the drywall ring if the drywall ring is not supported by the same screws holding the outlet box to the bracket.

For stud and ceiling mount applications, the bracket is preferably flat and without any steps. This feature permits the bracket to be mounted to the left or right of the mounting stud or ceiling or floor joist by simply flipping the bracket over sideways to reveal either its first or second face.

When the brackets are used for mounting conduit boxes upright in a wall (as opposed to in a wall or ceiling), the brackets are mounted such that the keyholes slots are in an upper portion of the bracket, with the wider ends of the keyhole slot being above the narrower lower region. In this orientation, the open slots are thereby positioned in a lower portion of the bracket. An outlet box with its screws left in place and loosened is hung on the bracket by placing the outlet box adjacent to the back of the bracket with a screw aligned to enter the wider end of the appropriate open keyhole slot and a screw at the entrance of an open slot. The conduit box is then slide diagonally downward, to move the conduit box such that the heads of the screws are retained in narrower region of the keyhole slot and in the open slots. Since gravity will tend to keep the outlet box in the lower position, the screws will remain in the narrower portion of the keyhole slots and the open slots and the outlet box will remain affixed to the bracket, even when the screws holding it to the bracket are untightened. Thereafter, either these same screws holding the conduit box to the bracket, or any screws on the conduit box that extend through the large holes in the bracket can be used to hold the drywall ring on the outwardly facing surface of the bracket.

BRIEF DESCRIPTION OF THE DRAWINGS

FIG. 1 is a perspective view of an embodiment of a floor mounting bracket of the invention.

FIG. 2 is a detail showing a group of closed keyhole slots in the bracket.

FIG. 5A is a of an embodiment of a horizontal mounting brackets of the invention.

FIG. 6 is a perspective view showing a 5S style outlet box with screws to be retained in two of its four tabs.

DETAILED DESCRIPTION OF THE INVENTION

Figure 3:
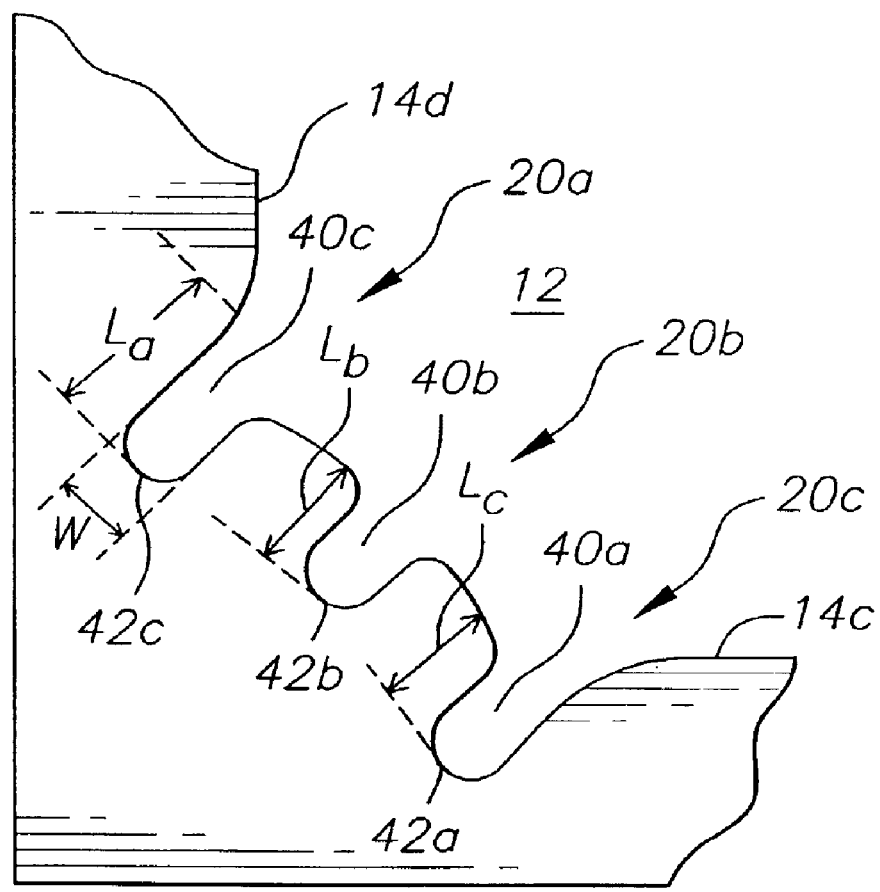
FIG. 3 is a detail showing a group of open slots in the bracket.

FIG. 1 is a perspective view of an embodiment of a floor mounting bracket 8 of the invention. The bracket 8 has a cutout pattern 10 in an upper end 11 of the bracket. The cutout pattern 10 includes a large opening 12 (which is generally rectangular with diagonally offset corners) with longer sidewalls (14a, 14b, 14c, 14d) and diagonal corners (16a, 16b, 16c, 16d). Two and preferably three keyhole slots (18a, 18b, 18c) are located adjacent to one diagonal corner 16b of the bracket, and two and preferably three open slots (20a, 20b, 20c) are located diagonally opposite the keyhole cutouts (18a, 18b, 18c). Closed keyhole slots 18a and 18b and open slots 20a and 20b are required in order to accept standard larger sized outlet boxes (5S size) and standard smaller sized outlet boxes (4S size). Closed keyhole slot 18c and open slot 20c are for use with standard larger sized outlet boxes (5S size) that are to be mounted to the bracket when the box is turned a quarter turn from its normal orientation with their screw tabs extending from the upper and lower sides of the conduit box, as will be discussed further below. Open slots (20a, 20b, 20c) are open to the large opening 12 and are in a lower corner of the bracket (e.g. 16d). Closed keyhole slots (18a, 18b, 18c) are oriented in an upper corner of the bracket (e.g. 16b). Inwardly of opposite diagonally opposed corners 16a and 16c, larger holes 22a and 22b and smaller threaded holes 24a and 24b are formed in the bracket. Lastly, a pair of bracket mounting holes 26a and 26b are provided on the bracket, and provide a place to screw a bracket to a stud or joist, as required. Far side bracket retaining means 28 (e.g. a slot) to retain a bracket (not shown) to extend from the back of the bracket 8 are provided. At a lower end of bracket 8 a base portion 30 is provided. Base 30 is capable of being fixedly attached to a floor, for example by fixing the base to a floor track (not shown) by means of fasteners. A riser portion 32 between base and position of cutout pattern 10 determines how high above the floor the conduit box will be positioned.

FIG. 2 is a detail showing closed keyhole slots 18a, 18b and 18c in the brackets. Closed keyhole slots 18a, 18b, 18c have a wider upper ends 34a, 34b and 34c and narrower lower end 36a, 36b and 36c. Wider upper end 34 is sized to be larger than a head of a screw used to retain a conduit box on the bracket, and narrower lower end 36 is sized to slidably receive the shaft of the screw used to retain a conduit box on the bracket. Closed keyhole slots 18 lie on an axis X. Closed keyhole slot 18b is formed closer to diagonal corner 16b than are closed keyhole slot 18a and 18c.

FIG. 3 is a detail showing a grouping of open slots 20a, 20b and 20c in the bracket. Each open slot has an opening, a length L and a width W. A terminal end 42b of slot 20b is set forward of terminal ends 42a and 42c of slots 20a and 20c.

Figure 4:
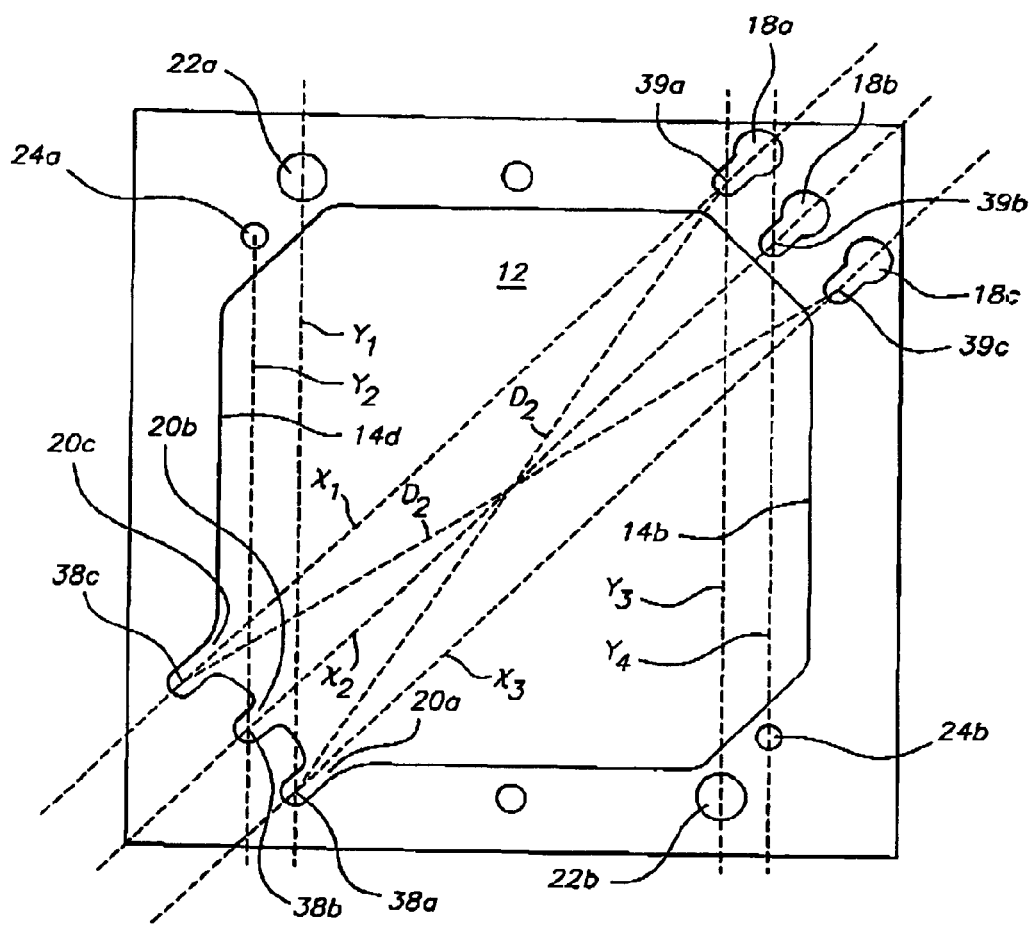
FIG. 4 is a detail of the cutout pattern.

FIG. 4 is a detail of the cutout pattern 10. As shown closed keyhole slots 18a, 18b and 18c each share a common imaginary axis $X_1$, $X_2$ and $X_3$, respectively, with open slots 20a, 20b and 20c. These axes $X_1$, $X_2$ and $X_3$ are preferably parallel and run diagonally across opening 12 of cutout pattern 10. Large hole 22a is preferably vertically aligned above a midpoint 39a of a terminal end of open slot 20a, and they lie on axis $Y_1$. Threaded hole 24 is preferably vertically aligned above a midpoint 38b of a terminal end of open slot 20b, they lie on axis $Y_2$. Large hole 22b is preferably vertically aligned below a midpoint 39a of the terminal end /narrower lower end 39a of closed keyhole slot 18a, and they lie on axis $Y_3$. Threaded hole 24b is preferably vertically aligned below a midpoint of a terminal end of narrower lower end 36b of closed keyhole slot 18b, which lie on axis $Y_4$. Axes $Y_1$, $Y2$, $Y_3$ and $Y_4$ are preferably parallel to sides 14d and 14b. The centers (39a, 38a) of terminal ends of closed keyhole 18a and terminal end of open slot 20a are spaced apart a distance of $D_2$, and the centers (39c, 38c) of terminal ends of closed keyhole 18c and terminal end of open slot 20c are also spaced apart a distance of $D_2$.

FIG. 5A is a top plan view of an embodiment of a stud mountable/horizontally mountable bracket 50 which has one of the same cutout pattern 10 as in the wall mount version of FIG. 1, and side bracket retaining means 28. Bracket 50 has cutout pattern 10 farmed therein with closed keyhole slots 18a, 18b and 18c formed above an upper corner 16b.

Figure 5B:
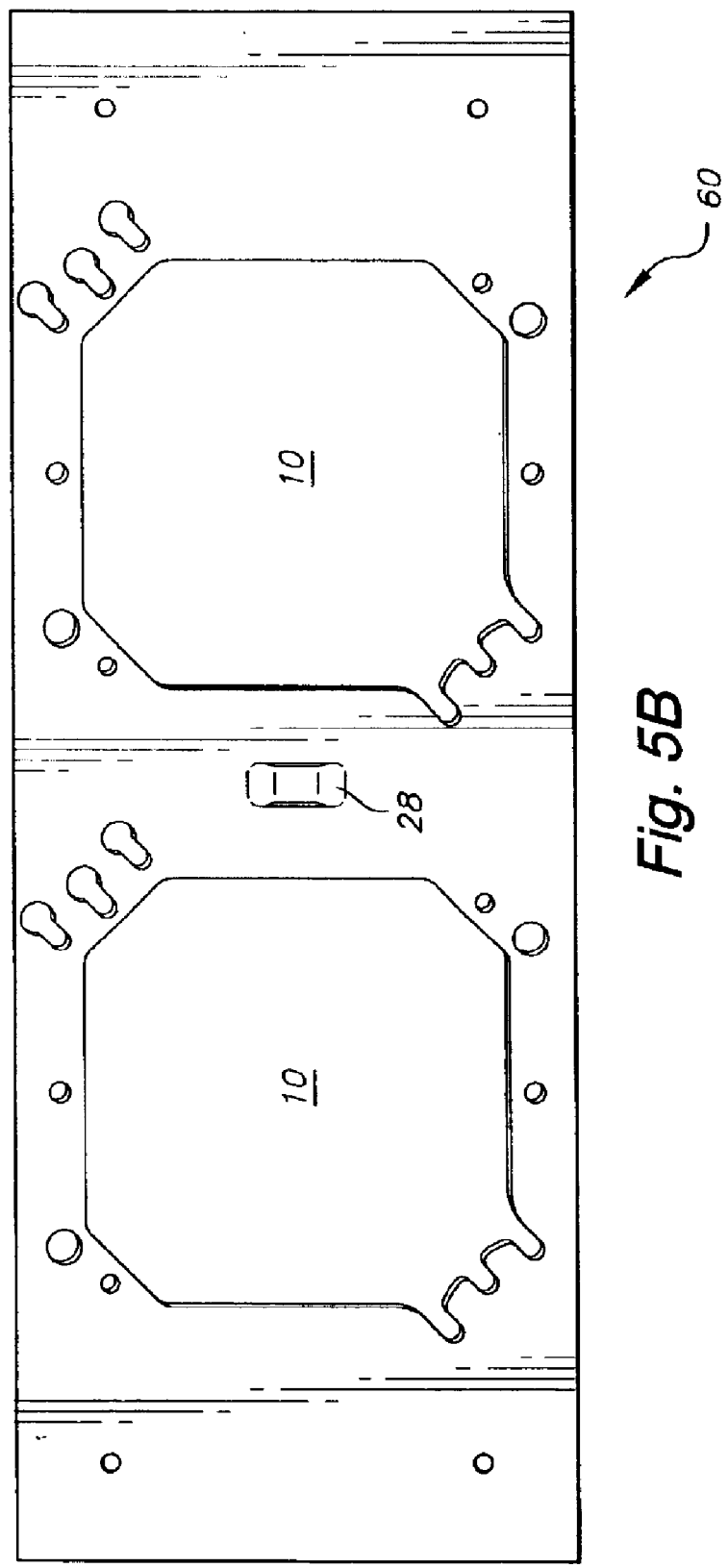
FIGS. 5B–5D are top plan views of horizontal mounting brackets with cutout patterns for retaining two, three and four conduit boxes thereto for mounting to a riser portion and/or between studs and ceiling joists.
Figure 5C:
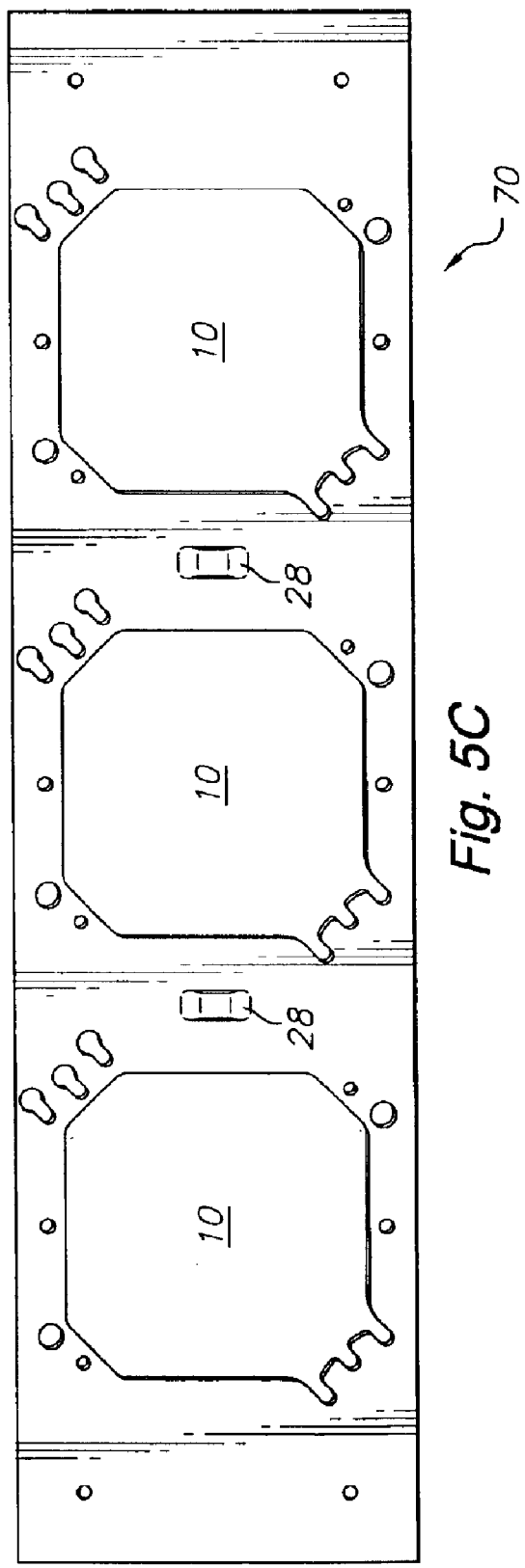
Figure 5D:
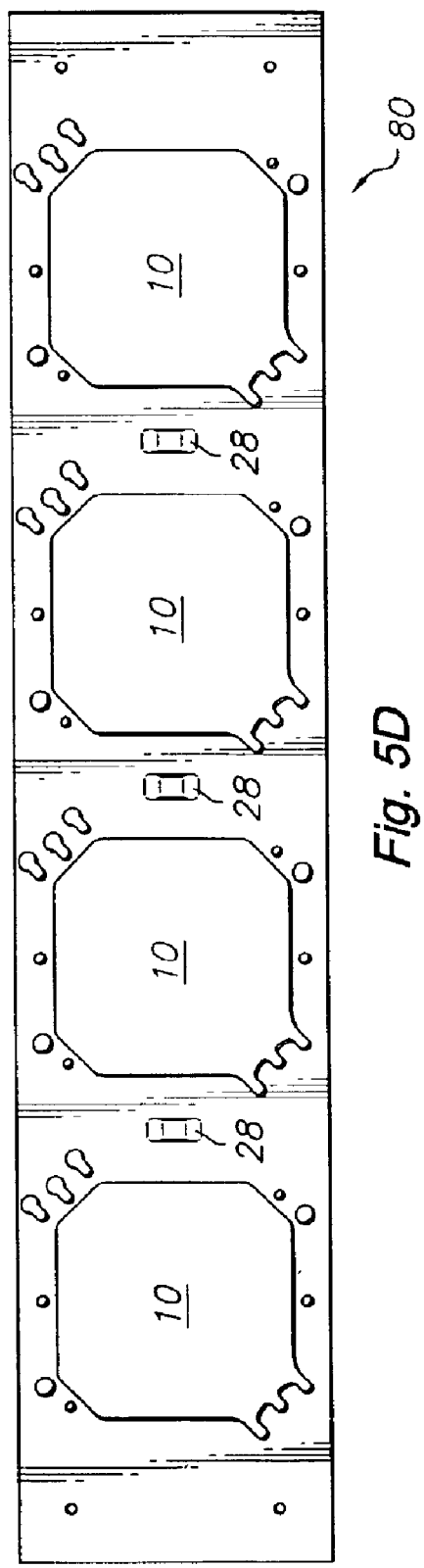

FIGS 5B–5D are top plan views embodiments of stud mountable/horizontally mountable bracket 60, 70 and 80 with two, three and four cutout patterns 10, respectively, formed therein in a spaced apart manner, for retaining two, three and four conduit boxes thereto (not shown).

FIG. 6 is a perspective view showing a standard 5S style outlet box 90 with screws 92 for retention in two threaded holes 94a and 94e of tabs 96a and 96c. Standard 5S style outlet boxes 90 are square, with an outside length and width of about 11.9 cm (4¹¹⁄₁₆ inches). The center of the threaded holes 94a and 94b, and 94c and 94d, are positioned inwardly from the sides 98b and 98c, respectively, by about 2.54 cm (1 inch), and from sides 98a and 98c, respectively, by about 0.63 cm (0.25 inches). The distance D, between the centers of the threaded holes 94a and 94c, and 94b and 94d is about 12.7 cm (5 inches). Outlet box 90 has knockout a 100 formed on its sides and back 102. The front of the box is open. Turning back to FIG. 4, the distance between the midpoint of the terminal end narrower lower end 36a and midpoint 38a of a terminal end of open slot 20a is generally the same as the distance D, between screw holes 94a and 94c, and 94b and 94d.

Figure 7:
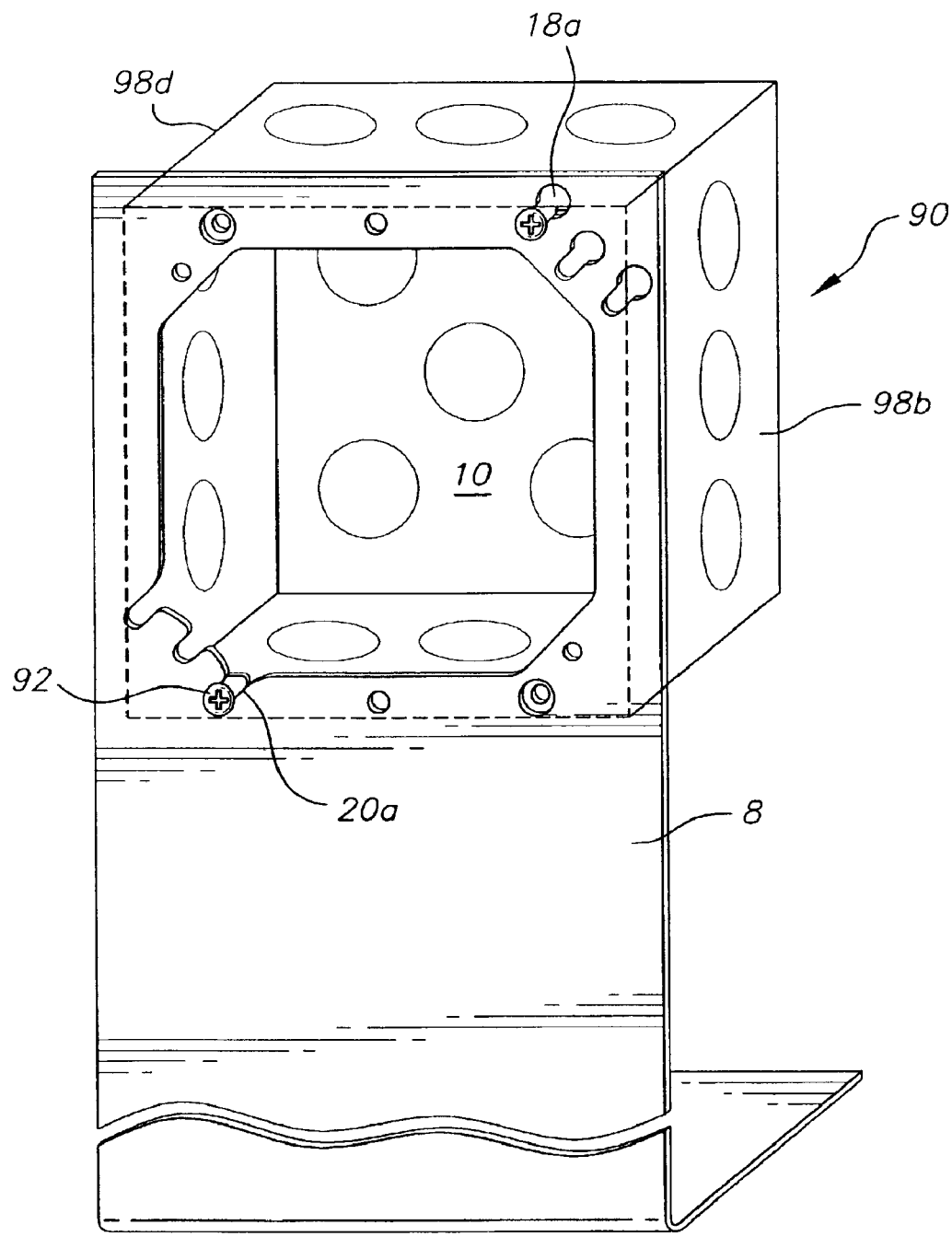
FIG. 7 is a perspective view showing a 5S style outlet box affixed to the back of floor mounting bracket of FIG. 1.

FIG. 7 is a perspective view showing the 5S style outlet box 90 of FIG. 6 hung on the back of floor mounting bracket 8 in its usual position such that the sides 98b and 98d of the conduit box 90 are vertically oriented relative to the bracket 8. As shown, a user can slide the outlet box 90 with screws in tabs 96a and 96c into dosed keyhole slot 18a and open slot 20a of the cutout pattern 10 of the bracket 8, and the outlet box 90 will slide downwardly relative to the cutout pattern 10 in bracket 8 so that the shafts of the screws 92 will be in the open slot 20a and narrow portion 34a of the closed keyhole slot 18a, and the outlet box 90 will remain hanging on the screw even if the screws are loosened.

Figure 8:
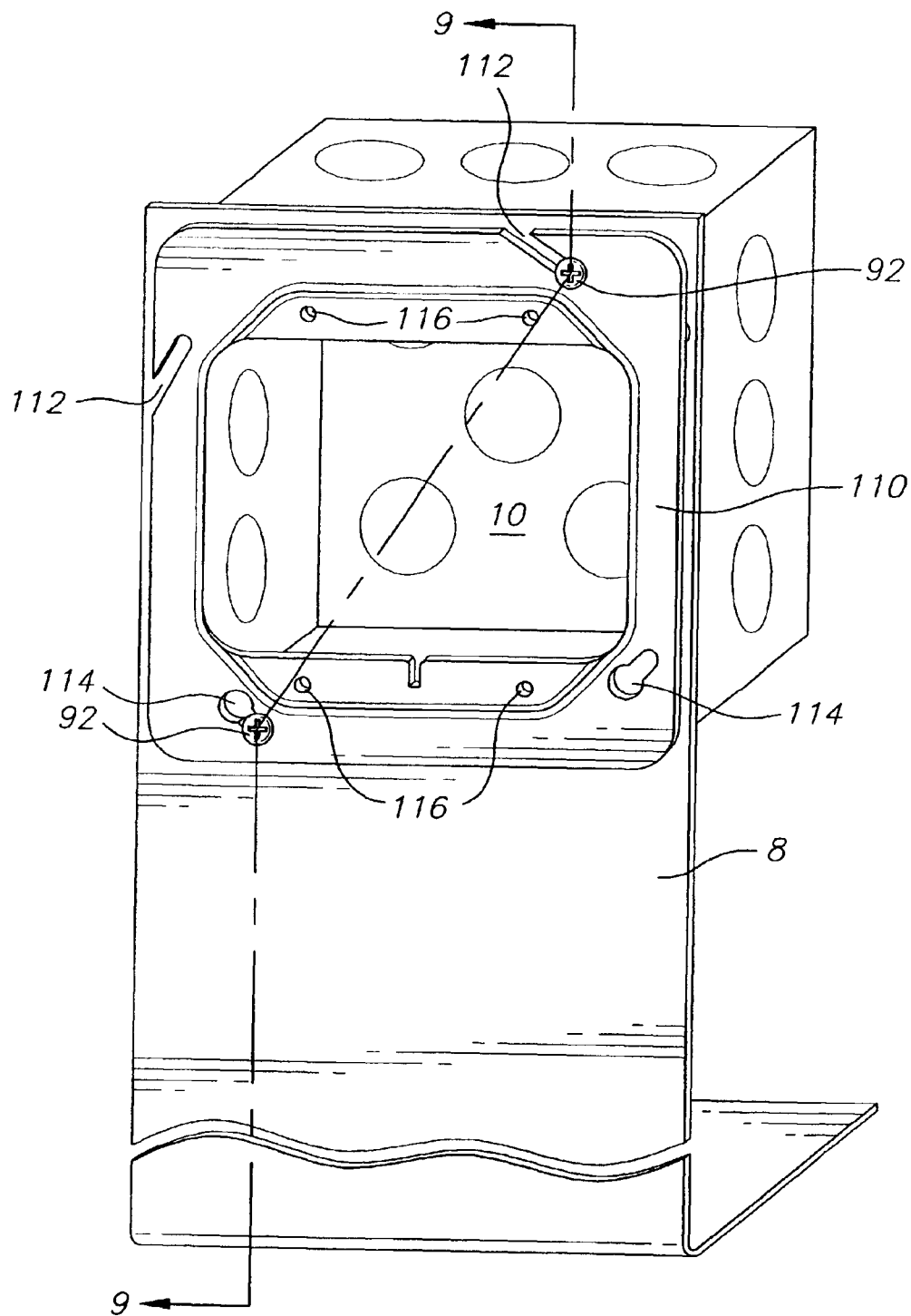
FIG. 8 is a perspective view showing the 5S style outlet box affixed to the back of floor mounting bracket of FIG. 8, with a 5S style double gang drywall ring affixed to the front surface of the bracket.
Figure 9:
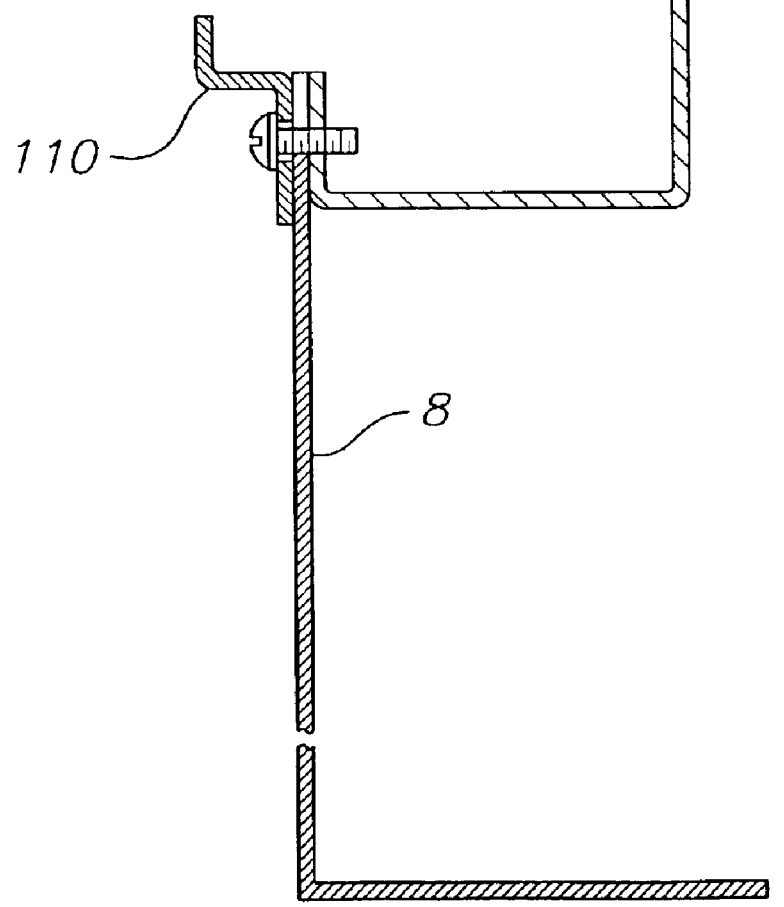
FIG. 9 is a side view along view lines 9—9 of FIG. 8.

Turning next to FIGS. 8 and 9, there are shown views of the 5S style outlet box 90 hung on the back of floor mounting bracket 8 as shown in FIG. 7, with a 5S style double gang drywall ring 110, with engagement slots 112 and keyhole slots 114 and screw holes 116 formed therein, affixed to the front surface of the bracket 8, with screws 92 holding drywall ring 110 in place. As can be appreciated, the same two screws 92 used to hold drywall ring 110 to the front of bracket 8 also holds the outlet box 90 to the back of the bracket 8, and the screws 92 can be loosened to permit the drywall ring 110 to be attached and detached from the front of the bracket 8 without causing the outlet box 90 from falling off the back of bracket 8 after installation. The drywall ring 110 can be rotated by 90° so that it is oriented relative to the box by 90° so that it can receive an electrical plug, switch, etc. in the offset position (e.g. set horizontally versus vertically.) The same screws 92 can still be used even when the drywall ring 110 is rotated.

Figure 10:
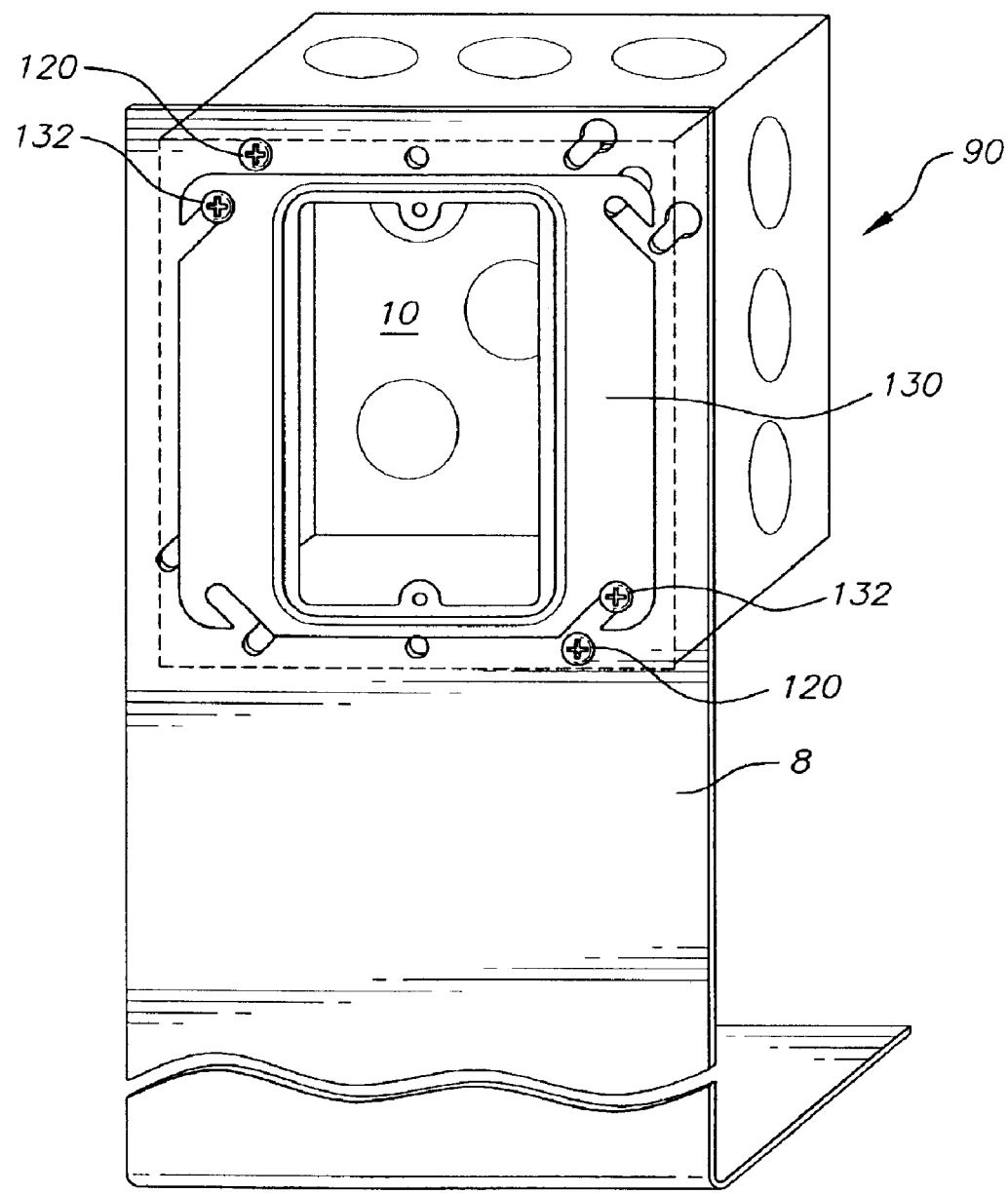
FIG. 10 is a front view showing a 5S style outlet box mounted to the back of the bracket in a quarter turn rotated position, with a 4S style drywall ring mounted to the front of the bracket.

In certain situations, it is necessary to mount a standard 5S box 90 rotated 90° from its normal position in order to accommodate unusual conduit run requirements, as shown in FIG. 10. In such situations, the standard 5S box 90 can still be mounted to the bracket 8, but flathead screws 120 are inserted through closed keyhole slots, 18c and open slot 20c of cutout pattern 10 and screw into threaded tabs 96a and 96c (not shown). The outlet box 90 will thus be secured to the back of the outlet. Thereafter, a smaller drywall ring, such as a 4S size ring 130, is retained to the front of the bracket with separate screws 132. The drywall ring can still be attached and detached from the bracket 8 without causing the conduit box 90 from falling off the bracket.

Figure 11:
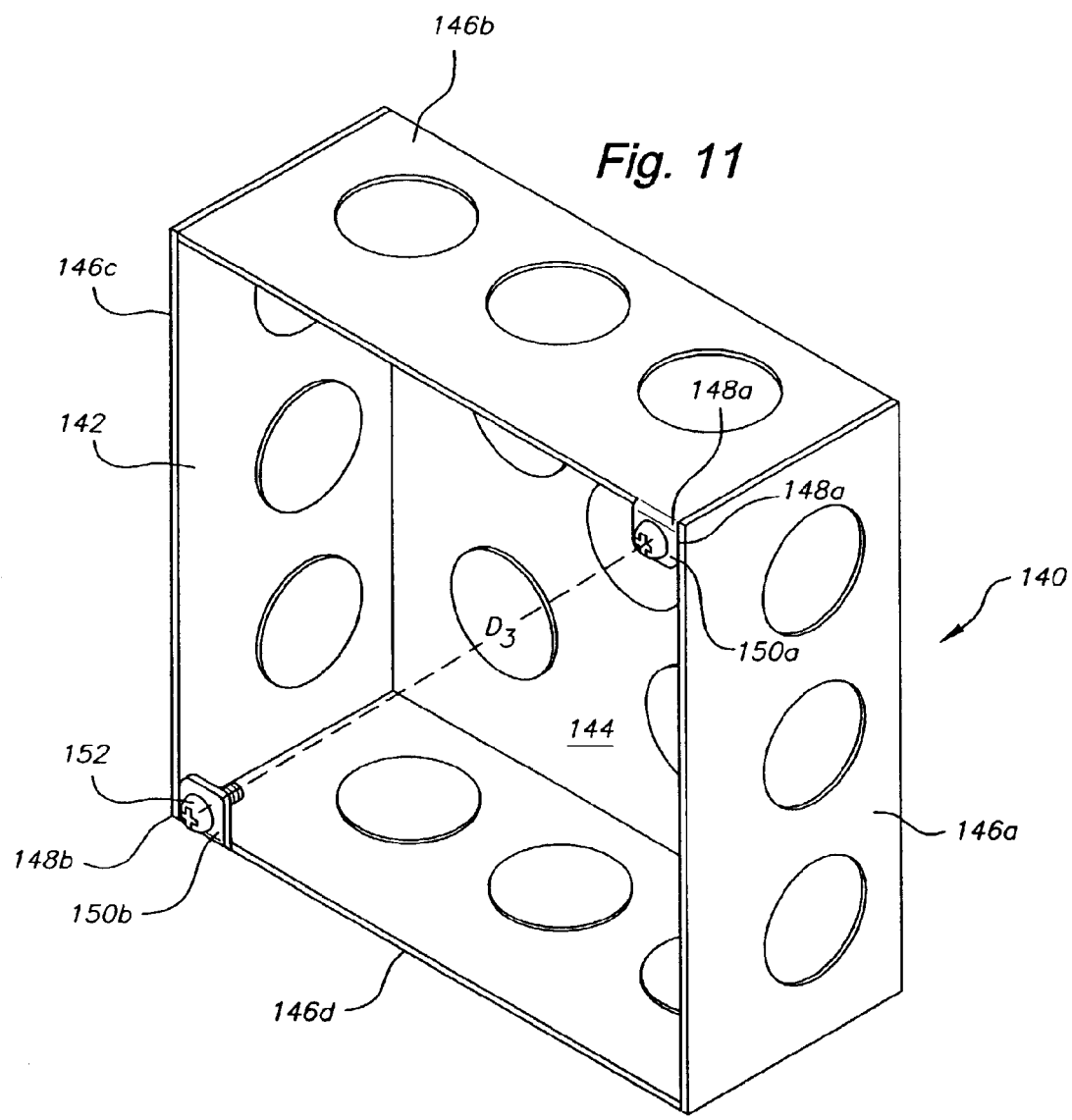
FIG. 11 is a perspective view showing a 4S style outlet box with screws retained in its two tabs.

Turning to FIG. 11, there is shown a perspective view of a standard 4S outlet box 140, which has an open front 142, a back wall 144, and sidewall 146a, 146b, 146c and 146d. At two corners 148a and 148b, tabs 150a and 150b are provided, with screws 152 inserted therein. Screws 152 are spaced apart by distance $D_8$, which is about the same spacing as the distance between terminal end of closed keyhole slot 36b and terminal end 42b of open slot 20b.

Figure 12:
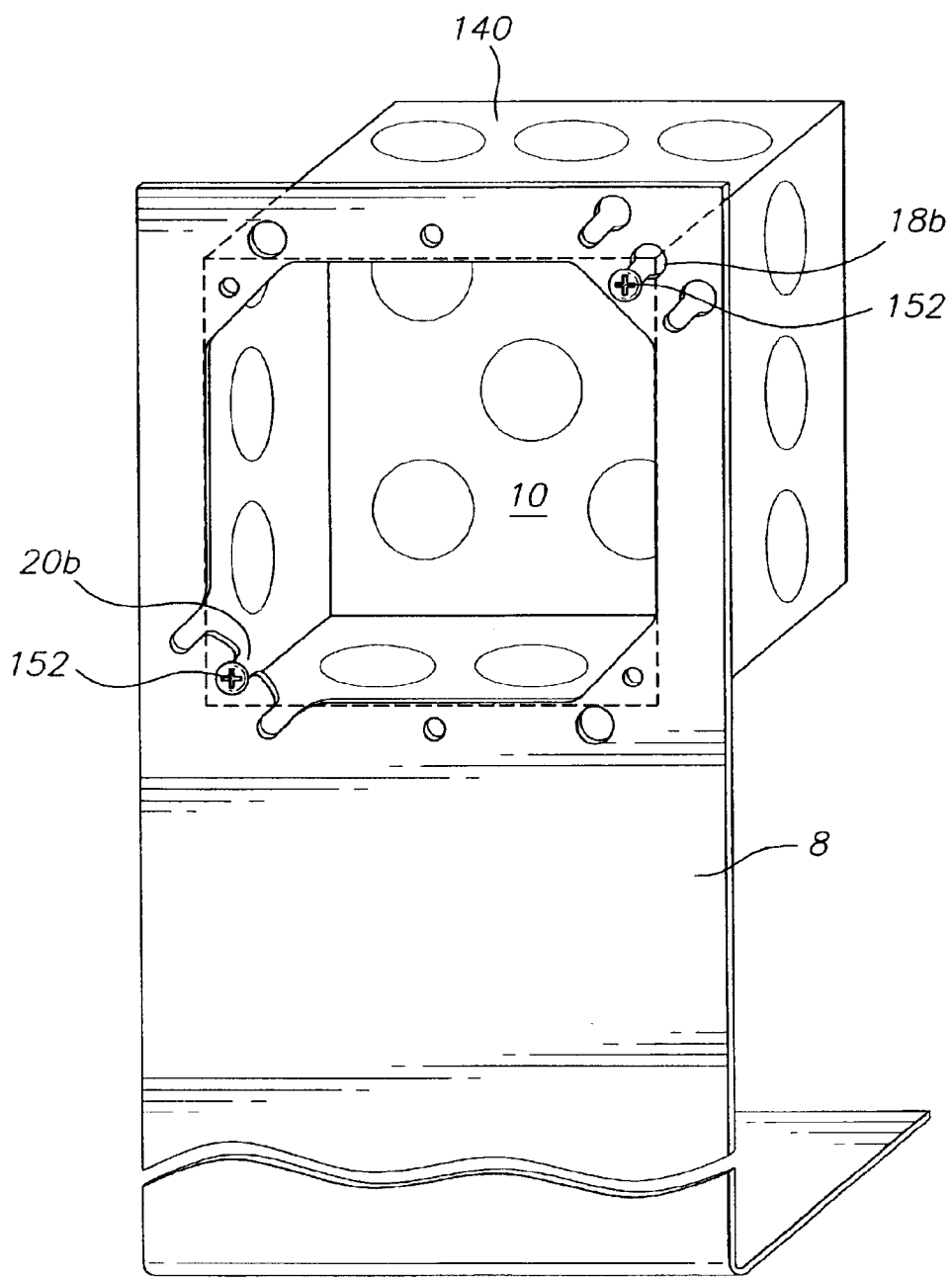
FIG. 12 is a perspective view showing the 4S style outlet box affixed to the back of floor mounting bracket of FIG. 1.

FIG. 12 is a perspective view showing the 4S style outlet box 140 affixed to the back of floor mounting bracket 8, which screws 152 being retained in closed keyhole slot 18b and open slot 20b.

Figure 13:
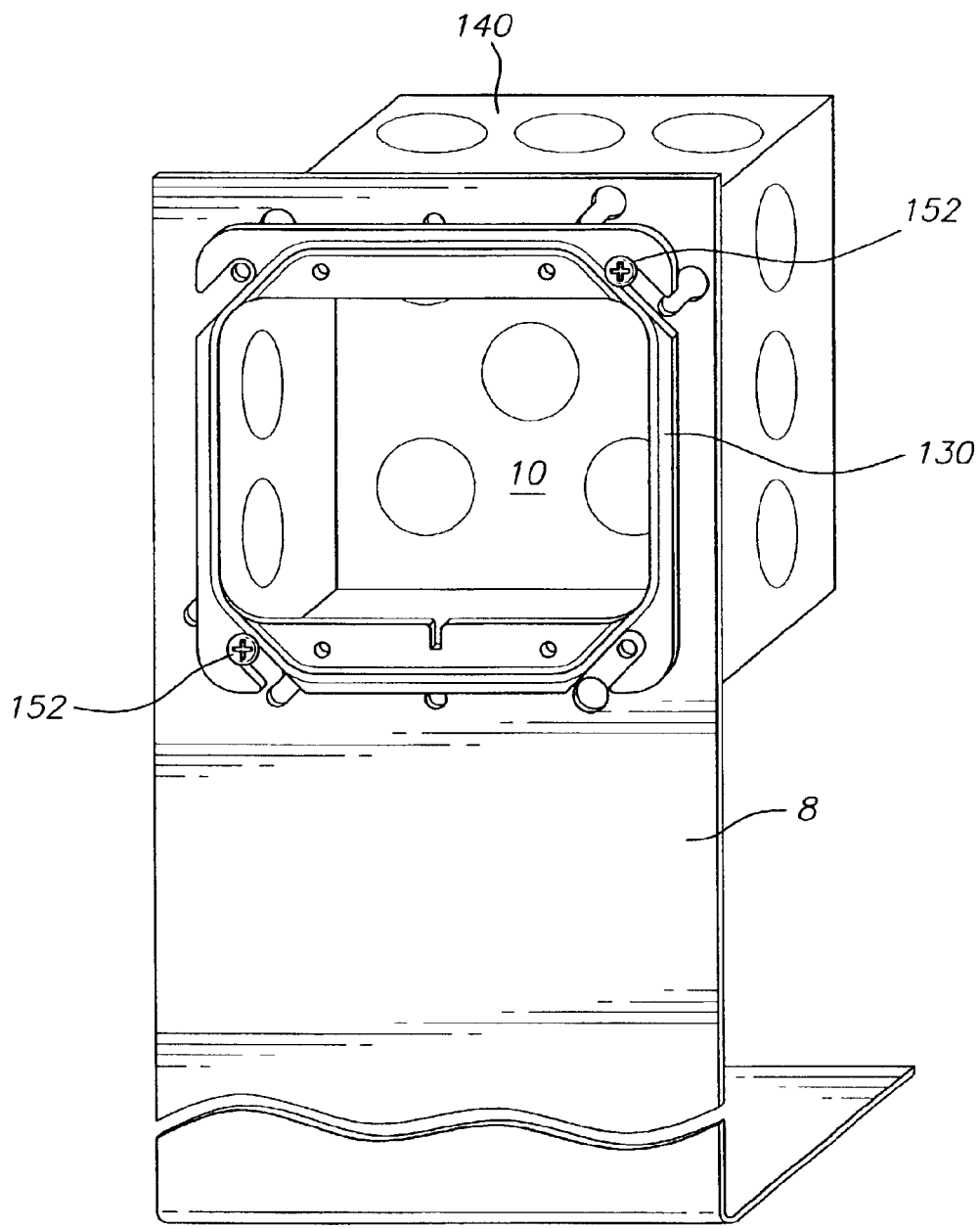
FIG. 13 is a perspective view showing the 4S style outlet box affixed to the back of floor mounting bracket with a 4S style double gang drywall ring affixed to front facing surface of the bracket.

FIG. 13 is a perspective view showing the 4S style outlet box 140 affixed to the back of floor mounting bracket 8 with a 4S style double gang drywall ring 130 affixed to front facing surface of the bracket 8, with the same screws 152 holding the conduit box 140 and drywall ring 130 to bracket 8.

Figure 14:
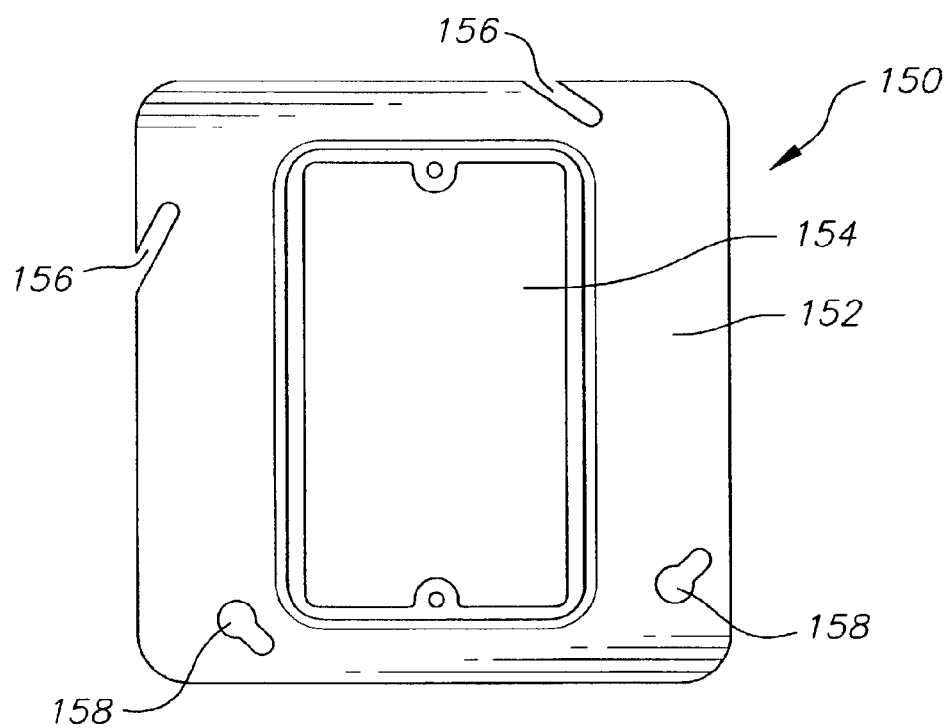
FIG. 14 is a top plan view of a 5S style single gang drywall ring.

FIG. 14 is a top plan view of a 5S style single gang drywall ring 150, which has a rim 152, an opening 154, open slots 156, and closed keyhole slots 158.

Figure 15:
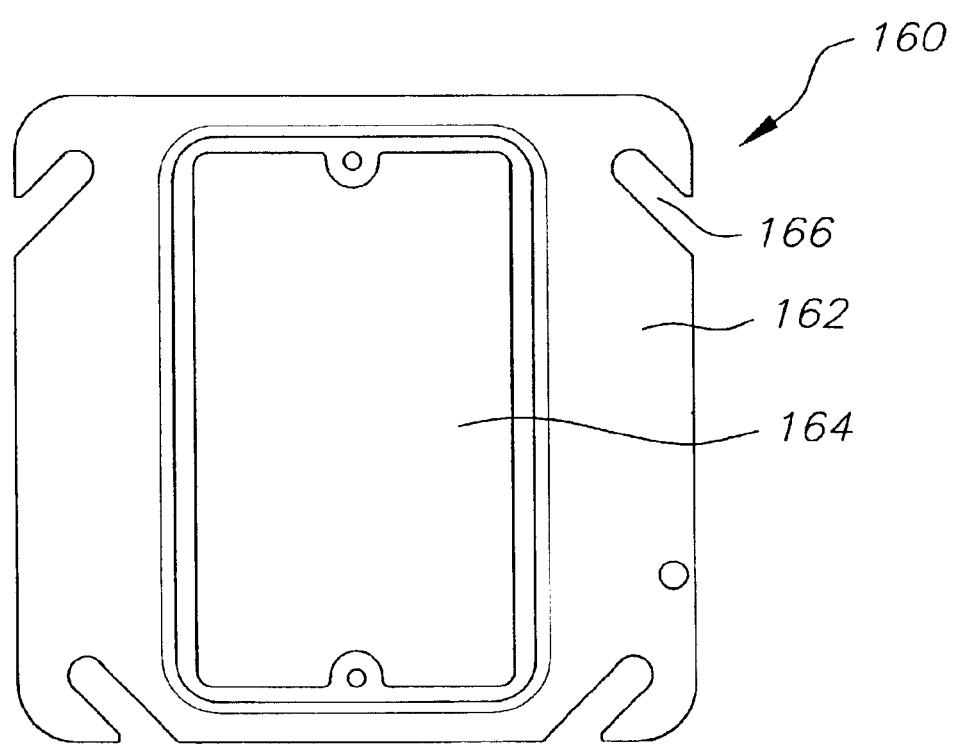
FIG. 15 is a top plan view of a 4S style single gang drywall ring.

FIG. 15 is a top plan view of a 4S style single gang drywall ring 160, which has a rim 162 with an opening 164 for receiving a single plug, outlet, etc. (not shown). Open slots 166 are provided on the rim 162. The rim 162 seats on the bracket when mounted thereto.

Although the 5S and 4S outlet boxes 90 and 140, respectively, have been described as attached to a floor mount bracket 8 with cutout patterns 10, the conduit boxes can be mounted to the cutout patterns of any bracket containing the cutout pattern, including those of FIGS. 5A–5D.

It can thus be seen how a single cutout pattern 10 formed in the bracket can provide for the greatest versatility to workers in mounting standard large and small conduit boxes, in different orientations, and with appropriate drywall rings, in such a manner that the conduit boxes will remain attached to the back of the bracket even when the drywall ring is attached and detached thereto.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive. The scope of the invention being indicated by the claims, rather than the foregoing description, and all changes which come within the meaning and range of equivalency of the claims are therefore intended to be embraced therein.

What is claimed is:

1. A universal electrical outlet box mounting bracket for use in retaining an outlet box and drywall ring, comprising:
    a section of material having a cutout pattern formed therein, the cutout pattern having a generally octagonal opening formed therein with a first, a second, a third and a fourth diagonally offset corner;
    at least a first and a second closed keyhole slot located inwardly of the first diagonal corner of the bracket, the keyhole slots having a wider end and a narrower slot portion with a terminal end; and
    at least a first and second open slot located diagonally opposite the keyhole slots in the third diagonal corner and opened therein, the open slots having a terminal end therein, the distance between the terminal end of the first closed keyhole slot and the terminal end of the first open slot being greater than the distance between the terminal end of the second closed keyhole slot and the terminal end of the second open slot, and wherein the first keyhole slot and the first open slot have longitudinal axes that are aligned on a common axis, and the second keyhole slot and the second open slot have longitudinal axes that are aligned on a common axis.

2. The universal electrical outlet box mounting bracket of claim 1, further comprising a third keyhole slot formed adjacent to the second keyhole slot and a third open slot formed adjacent to the second open slot, the distance between the terminal end of the third closed keyhole slot and the terminal end of the third open slot being the same as the distance between the terminal end of the first closed keyhole slot and the terminal end of the first open slot, and wherein the third keyhole slot and the third open slot have longitudinal axes that are aligned on a common axis.

3. The universal electrical outlet box mounting bracket of claim 2, wherein the common axis of the first keyhole slot and the first open slot, the common axis of the second keyhole slot and the second open slot, and the common axis of the third keyhole slot and the third open slot, respectively, are aligned in parallel lines.

4. The universal electrical outlet box mounting bracket of claim 1, further comprising a first large hole and a first small threaded hole located inwardly of the second diagonal corner and a second large hole and a second small threaded hole located inwardly of the fourth diagonal corner.

5. The universal electrical outlet box mounting bracket of claim 4, wherein the first large hole is vertically aligned above the terminal end of the first open slot, and the second large hole is vertically aligned below a terminal end of a third keyhole slot.

6. The universal electrical outlet box mounting bracket of claim 4, wherein the first small threaded hole is vertically aligned above the terminal end of the second open slot, and the second small threaded hole is vertically aligned below the terminal end of the second keyhole slot.

7. The universal electrical outlet box mounting bracket of claim 1, further comprising mounting holes formed in the bracket.

8. The universal electrical outlet box mounting bracket of claim 1, further comprising a base at a lower end thereof for mounting the bracket to a floor and a riser portion above the base and intermediate the portion of the bracket bearing the cutout pattern, the cutout pattern being formed on an upper end of the riser portion, and the keyhole slots being formed adjacent to an upper diagonal corner of the generally octagonal opening.

9. The universal electrical outlet box mounting bracket of claim 8, wherein the riser portion and the portion of the bracket bearing the cutout pattern are formed of flat sheet metal.

10. The universal electrical outlet box mounting bracket of claim 1, wherein the closed keyhole slots and the open slots both have an axis of symmetry aligned with a diagonal axis therebetween, and wherein the larger ends of the keyhole slots are spaced away from the opening in the bracket.

11. The universal electrical outlet box mounting bracket of claim 1, wherein a plurality of cutout patterns are formed on the section of material to permit a plurality of electrical outlet boxes to be attached to the bracket.

12. The universal electrical outlet box mounting bracket of claim 1, wherein the section of material having the cutout pattern formed therein is flat to permit the bracket to be mounted to the left or right of a bracket support.

13. The universal electrical outlet box mounting bracket of claim 1, wherein the bracket further comprises a far side bracket support engagement.

14. An electrical outlet box mounting bracket for mounting large size 5S and small size 4S standard electrical outlet boxes with diagonally opposed tabs with screw holes formed therein, the bracket comprising:

a flat section of material having a cutout pattern formed therein, the cutout pattern having a generally octagonal opening formed therein with a first, a second, a third and a fourth diagonally offset corner, and straight edges therebetween;

a first, a second and a third closed keyhole slot located inwardly of the first diagonal corner of the bracket, the keyhole slots having a wider end and a narrower slot portion with a terminal end;

a first, a second and a third open slot located diagonally opposite the keyhole slots in the third diagonal corner and opened therein, the open slots having a terminal end therein, the distances between the terminal end of the first closed keyhole slot and the terminal end of the first open slot and between the terminal end of the third closed keyhole slot and the terminal end of the third open slot adapted to be about the same as the spacing of screw holes in diagonally opposed tabs of a standard 5S electrical outlet box, and the distance between the terminal end of the second closed keyhole slot and the terminal end of the second open slot adapted to be about the same as the spacing of screw holes in diagonally opposed tabs of a standard 4S electrical outlet box, wherein the first keyhole slot and the first open slot have longitudinal axes that are aligned on a common axis, the second keyhole slot and the second open slot have longitudinal axes that are aligned on a common axis, and the third keyhole slot and the third open slot have longitudinal axes that are aligned on a common axis; and a first large hole and a first small threaded hole located inwardly of the second diagonal corner and a second large hole and a second small threaded hole located inwardly of the fourth diagonal corner.

15. The universal electrical outlet box mounting bracket of claim 14, wherein the common axis of the first keyhole slot and the first open slot, the common axis of the second keyhole slot and the second open slot, and the common axis of the third keyhole slot and the third open slot are aligned in parallel lines.

16. The universal electrical outlet box mounting bracket of claim 14, wherein the first large hole is vertically aligned above the terminal end of the first open slot, and the first small hole is vertically aligned above the terminal end of the second open slot, and the second large hole is vertically aligned below the terminal end of the third keyhole slot, and the second small hole is vertically aligned below the terminal end of the second keyhole slot.

17. The universal electrical outlet box mounting bracket of claim 14, further comprising a base at a lower end therefor for mounting the bracket to a floor and a riser portion above the base and intermediate the portion of the bracket bearing the cutout pattern, the cutout patterns being formed on an upper end of the riser portion, and the keyhole slots being formed adjacent to an upper diagonal corner of the generally octagonal opening.

18. The universal electrical outlet box mounting bracket of claim 17, wherein the riser portion and the portion of the bracket bearing the cutout pattern are formed of flat sheet metal.

19. The universal electrical outlet box mounting bracket of claim 14, further comprising mounting holes formed in bracket.

20. The universal electrical outlet box mounting bracket of claim 14, wherein a plurality of cutout patterns are formed on the section of material to permit a plurality of electrical outlet boxes to be formed to the bracket.

21. The universal electrical outlet box mounting bracket of claim 14, wherein the section of material having the cutout pattern formed therein is flat to permit the bracket to be mounted to the left or right of a bracket support.

22. The universal electrical outlet box mounting bracket of claim 14, wherein the bracket further comprises a far side bracket support engagement.

* * * * *